(12) United States Patent
Coffey et al.

(10) Patent No.: US 11,302,363 B2
(45) Date of Patent: Apr. 12, 2022

(54) DATA STORAGE DEVICES, AND RELATED COMPONENTS AND METHODS OF MAKING

(71) Applicant: Seagate Technology LLC, Fremont, CA (US)

(72) Inventors: Jerome Coffey, Boulder, CO (US); Sam Severson, Longmont, CO (US); David Lapp, Boulder, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/241,907

(22) Filed: Apr. 27, 2021

(65) Prior Publication Data

US 2021/0264953 A1 Aug. 26, 2021

Related U.S. Application Data

(62) Division of application No. 16/406,728, filed on May 8, 2019, now Pat. No. 11,017,819.

(51) Int. Cl.
*G11B 33/12* (2006.01)

(52) U.S. Cl.
CPC .................. *G11B 33/121* (2013.01)

(58) Field of Classification Search
None
See application file for complete search history.

(56) References Cited

U.S. PATENT DOCUMENTS

| 5,156,919 | A |   | 10/1992 | Brar et al. |
|---|---|---|---|---|
| 5,187,625 | A |   | 2/1993 | Blaeser et al. |
| 5,408,372 | A | * | 4/1995 | Karam, II ............ G11B 5/4833 360/244.2 |
| 5,627,701 | A |   | 5/1997 | Misso et al. |
| 5,632,628 | A |   | 5/1997 | Wagner |
| 5,677,815 | A | * | 10/1997 | Chan .................... G11B 5/4833 360/264.2 |
| 5,835,311 | A |   | 11/1998 | Brooks, Jr. et al. |
| 5,973,883 | A |   | 10/1999 | Yanagisawa |
| 6,087,620 | A |   | 7/2000 | Brooks, Jr. et al. |
| 6,091,578 | A |   | 7/2000 | Stole et al. |
| 6,151,198 | A |   | 11/2000 | Prater et al. |

(Continued)

FOREIGN PATENT DOCUMENTS

| CN | 203872476 U | 10/2014 |
|---|---|---|
| JP | 61039901 A | 2/1986 |

(Continued)

OTHER PUBLICATIONS

"Existing Commercial use of Cold Spray", Retrieved on Feb. 8, 2019 via https://www.marsctechnologies.com/existing-commercial-use, (6 pages).

(Continued)

*Primary Examiner* — William J Klimowicz
(74) *Attorney, Agent, or Firm* — Kagan Binder, PLLC (57) ABSTRACT

The present disclosure relates to a data storage device interior components and/or data storage device housing components that include one or more solid-state deposition layers, and related methods of applying solid-state material to said components via solid-state deposition.

18 Claims, 6 Drawing Sheets

(56) References Cited

U.S. PATENT DOCUMENTS

| | | | |
|---|---|---|---|
| 6,250,364 B1* | 6/2001 | Chung | B22D 11/0405 164/113 |
| 6,359,755 B1 | 3/2002 | Dietzel et al. | |
| 6,632,310 B2* | 10/2003 | Freeman | G11B 5/4833 156/182 |
| 6,731,472 B2 | 5/2004 | Okamoto et al. | |
| 6,751,068 B1* | 6/2004 | Kant | G11B 5/4813 360/265.8 |
| 6,813,120 B1 | 11/2004 | Misso | |
| 6,961,208 B2* | 11/2005 | Kant | G11B 25/043 360/900 |
| 7,040,004 B2* | 5/2006 | Liem | G11B 5/4826 29/593 |
| 7,042,681 B1* | 5/2006 | Fruge | G11B 5/4813 360/265.8 |
| 7,224,554 B2 | 5/2007 | Wright | |
| 7,522,382 B1 | 4/2009 | Pan | |
| 7,623,320 B2 | 11/2009 | Johnson et al. | |
| 7,697,240 B2* | 4/2010 | Funabashi | G11B 5/4833 360/265.9 |
| 7,701,672 B2 | 4/2010 | Zeng et al. | |
| 8,416,531 B2 | 4/2013 | Benda | |
| 8,533,934 B2 | 9/2013 | McGuire, Jr. et al. | |
| 9,162,251 B2 | 10/2015 | Hirano et al. | |
| 9,765,435 B2 | 9/2017 | Zahiri et al. | |
| 9,805,750 B1 | 10/2017 | Ramakrishnan et al. | |
| 9,905,907 B2 | 2/2018 | Wang et al. | |
| 9,951,425 B2 | 4/2018 | Lancaster-Larocque et al. | |
| 10,359,804 B2 | 7/2019 | Hamel et al. | |
| 10,796,727 B1 | 10/2020 | Coffey et al. | |
| 2002/0057536 A1 | 5/2002 | Boutaghou et al. | |
| 2002/0182311 A1 | 12/2002 | Leonardi et al. | |
| 2002/0186512 A1* | 12/2002 | Kubotera | G11B 5/5565 360/266 |
| 2005/0141135 A1 | 6/2005 | Soga et al. | |
| 2007/0002489 A1 | 1/2007 | Abe | |
| 2007/0171578 A1 | 7/2007 | Kamigama et al. | |
| 2007/0206332 A1* | 9/2007 | Gong | G11B 5/484 360/265.9 |
| 2007/0241164 A1 | 10/2007 | Barnes et al. | |
| 2008/0259503 A1 | 10/2008 | Aoyagi et al. | |
| 2009/0195919 A1 | 8/2009 | Mahadev | |
| 2010/0015467 A1 | 1/2010 | Zimmermann et al. | |
| 2014/0339093 A1 | 11/2014 | Lancaster-Larocque et al. | |
| 2015/0015990 A1 | 1/2015 | Chou et al. | |
| 2017/0169860 A1 | 6/2017 | Sudo et al. | |
| 2017/0169861 A1 | 6/2017 | Sudo et al. | |
| 2017/0169862 A1 | 6/2017 | Sudo et al. | |
| 2017/0260622 A1 | 9/2017 | Koestenbauer et al. | |
| 2018/0320270 A1 | 11/2018 | Nardi et al. | |
| 2020/0395049 A1 | 12/2020 | Coffey et al. | |

FOREIGN PATENT DOCUMENTS

| | | | |
|---|---|---|---|
| JP | 61202302 A | 9/1986 | |
| JP | 61248201 A | 11/1986 | |
| JP | 62117101 A | 5/1987 | |
| JP | 06295542 A | 10/1994 | |
| JP | 07254246 A | 10/1995 | |
| JP | 2007253172 A | 10/2007 | |
| WO | 9828467 A1 | 7/1998 | |
| WO | 2013149291 A1 | 10/2013 | |

OTHER PUBLICATIONS

Moridi et al., "Cold spray coating: review of material systems and future perspectives", Institute of Materials, Minerals and Mining, vol. 36, No. 6, pp. 369-395, Mar. 5, 2014, (27 pages).

"Cold Spraying", Retrieved on Sep. 27, 2018 via https://www.twi-globa.l.com/capabilities/materials-and-corrosion-management/surface-engineering-and-advanced-coatings/cold-spraying/, (2 pages).

Yamauchi et al., "Interfacial state and characteristics of cold-sprayed copper coatings on aluminum substrate", Materials Science and Engineering 61, 2014, (8 pages).

"Titomic granted US patent for cold-spray titanium Additive Manufacturing", dated Oct. 13, 2017, retrieved from https://www.metal-am.com/titomic-granted-us-patent-cold-spray-titanium-additive-manufacturing/, (1 page).

Irissou et al., "Review on Cold Spray Process and Technology: Part I—Intellectual Property", Journal of Thermal Spray Technology, vol. 17(4), pp. 495-516, Dec. 2008, (22 pages).

Rybdylova et al., "Aerodynamic focusing of inertial particles in supersonic micronozzles", Proc. Appl. Math. Mech. 13, 503-504 (2013), (2 pages).

"Materials Deposition, Cold Spray", Department of Defense Manufacturing Process Standard, Aug. 4, 2008, (19 pages).

"Kinetic Metallization: Coatings Once Thought Impossible", retrieved from https://www.inovati.com/ on May 21, 2019, (3 pages).

"Cold Spray Repair of Magnesium", ARL Center for Cold Spray, May 17, 2011, (44 pages).

Murray et al., "Design and Production of Powders Tailored to Cold Spraying", retrieved from: https://www.materials.sandvik/globalassets/global/downloads/products_downloads/metal_powders/technical_papers/design-and-production-of-powders-tailored-to-cold-spraying.pdf, on Oct. 29, 2019, (4 pages).

Widener et al., "B1 Bomber-FEB Panel Repair by Cold Spray", CSAT Meeting: WPI, Worcester, MA, Oct. 30, 2012, (29 pages).

"Cold Spray Applications", Retrieved from https://www.coldsprayteam.com/aboutcoldspray.html, CSAT 2019 Presentations, 2019, (3 pages).

Champagne et al., "Critical Assessment 11: Structural repairs by cold spray", Materials Science and Technology, vol. 31, No. 6, Nov. 27, 2014, (27 pages).

Hoey et al., "CAB-DWTM for 5 μm trace-width deposition of solar cell metallization top-contacts", Jun. 2009, (7 pages).

Singh et al., "Cold spray technology: Future of coating deposition processes", Frattura ed Integrità Strutturale, 69-84, Oct. 2012, (17 pages).

"Cold Spray Repair of Magnesium" May 17, 2011 presented at Cold Spray Action Team workshop in Salisbury Room 115 in Kinnicutt Hall on the Worcester Polytehnic Institute, retrieved at https://www.coldsprayteam.com/files/Gabriel_CSAT_2011.pdf, (44 pages).

CSAT 2018, retrieved at https://www.coldsprayteam.com/csat2018.html, Jun. 2018, (2 pages).

Helfritch, "Economics of Cold Spray-Cost Analysis", May 17, 2011 presented at Cold Spray Action Team workshop in Salisbury Room 115 in Kinnicutt Hall on the Worcester Polytehnic Institute, retrieved at https://www.coldsprayteam.com/2011CSATmeeting.html, (8 pages).

McDonald et al., "Cold Spray Activities in Canada", Nov. 30, 2016, presented at North American Cold Spray Conference 2016 Alberta Innovates—Technology Futures (AITF) 250 Karl Clack Road Edmonton, AB, Canada, retrieved at https://www.asminternational.org>documents>1+-+McDonald.pdf, (32 pages).

Birtch et al., "Cold Spray Equipment Work Group", retrieved at https://www.coldsprayteam.com/files/Cold%20Spray%20Equipment%20Work%20Group%203.ppt, (8 pages).

"Individual particle characterization device for cold spray processes", retrieved at https://www.tecnar.com/coldspray-meter/, (4 pages).

"The new Generation of Cold Spray System KINETIKS 4000", retrieved at www.tecnospray.net/download/polvereColdSpray.pdf, (19 pages).

"Titomic to 3D Print Callaway Golf Clubs", Posted on May 15, 2019, (1 page).

"Consumer Goods", retrieved at https://www.titomic.com/consumer-goods.html, (2 pages).

Unpublished United States Utility U.S. Appl. No. 16/406,728, filed May 8, 2019 (Not attached).

Unpublished United States Utility U.S. Appl. No. 17/241,934, filed Apr. 27, 2021 (Not attached).

Sabard et al., "Bonding mechanisms in cold spray deposition of gas atomised and solution heat-treated Al 6061 powder by EBSD", Faculty of Engineering, University of Nottingham, Nov. 2018, (31 pages).

* cited by examiner

DATA STORAGE DEVICES, AND RELATED COMPONENTS AND METHODS OF MAKING

CROSS-REFERENCE TO RELATED APPLICATION

This application is a divisional patent application of nonprovisional patent application Ser. No. 16/406,728 filed on May 8, 2019, wherein said nonprovisional patent application is incorporated herein by reference in its entirety.

The present application is related to U.S. Pat. No. 10,796,727 (Coffey et al.), wherein the entirety of said patent is incorporated herein by reference.

The present application is related to U.S. Pub. No. 2020/0395049 (Coffey et al.).

BACKGROUND

The present disclosure relates to data storage device housing components, components within a data storage device, and related data storage devices.

SUMMARY

The present disclosure includes embodiments of a composite data storage device component including at least one solid-state, deposition layer over only a portion of one or more surfaces of a data storage device component.

DETAILED DESCRIPTION

The present disclosure relates to using solid state deposition to selectively and strategically manage one or more properties of one or more portions of a data storage device.

Non-limiting examples of data storage devices include hard disk drives (internal and/or external), solid state drives (external and/or internal), network attached storage (NAS), flash storage devices, and the like. The present disclosure illustrates several embodiments of a hard disk drive as one type of a data storage device.

Figure 1:
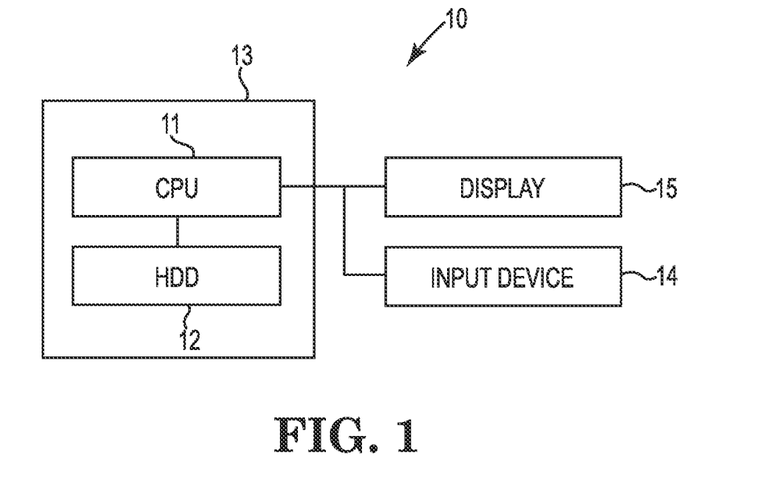
FIG. 1 is a block diagram schematically illustrating the structure of a computer apparatus that includes a hard disk drive as data storage device.

FIG. 1 schematically illustrates the structure of a computer apparatus 10. The computer apparatus 10 includes a computer unit 13 assembled with a central processing unit (CPU) 11, and a hard disk drive (HDD) 12 as a data storage device. The CPU 11 is capable of sending and receiving information data to and from the HDD 12 in accordance with instructions input from an input device 14, such as a keyboard and/or a mouse, which is connected to the computer unit 13. The information data may be displayed on a screen of a display device 15 which is connected to the computer unit 13.

Figure 2:
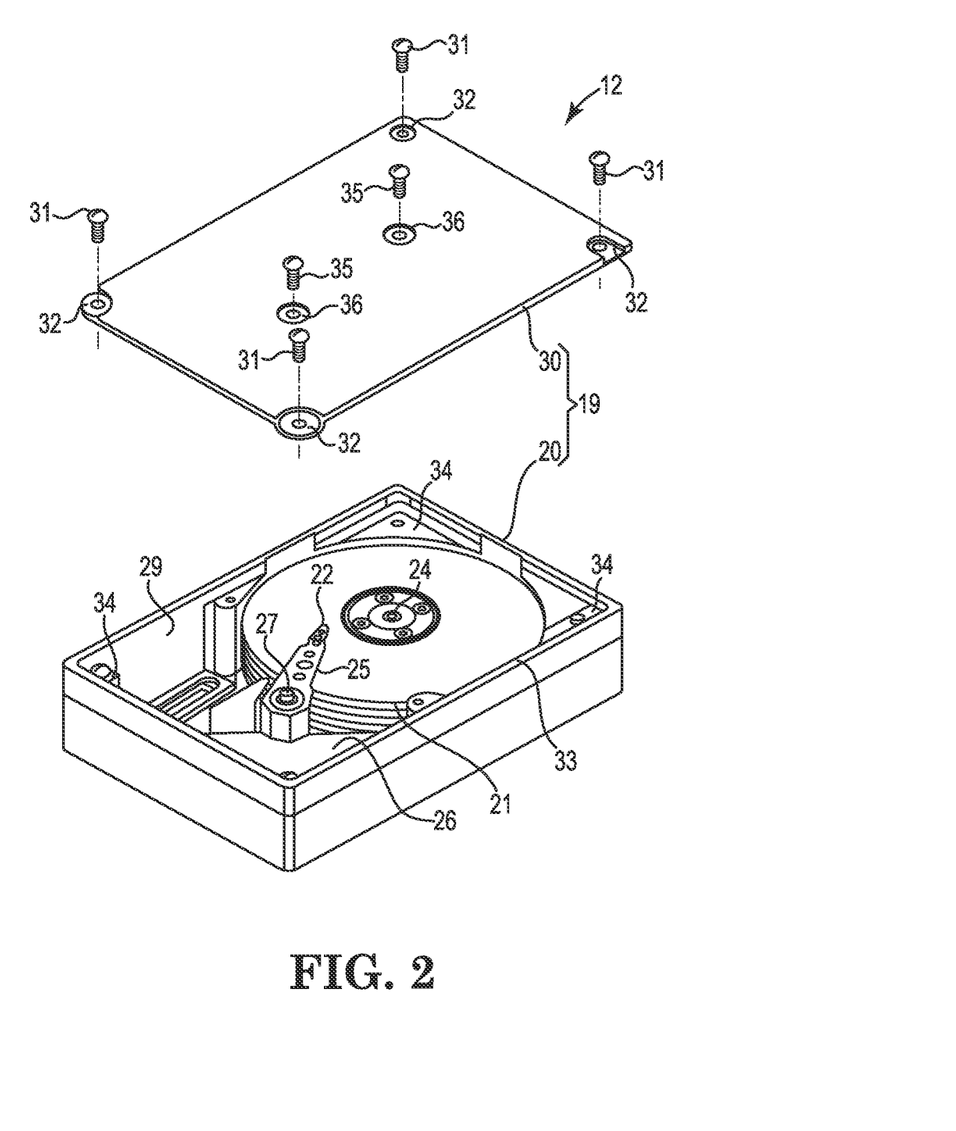
FIG. 2 is an exploded perspective view of a hard disk drive.

FIG. 2 illustrates an exploded perspective view of an HDD 12. As shown, HDD 12 includes a housing 19 having base 20 and at least one top cover plate 30 (also referred to as a cover). In some embodiments, top cover plate 30 can be a final cover plate mounted over a process cover plate. As shown in FIG. 2, base 20 is a box-shaped housing component.

As shown, the base 20 can accommodate one or more magnetic disks 21 as recording media for recording information data, and magnetic heads 22 opposed to the disk surfaces of the respective recording disks 21 for reading and writing information. The recording disks 21 may rotate about a rotation axis 24 fixed to the base 20. The rotation of the disks 21 can be driven by a spindle motor, not shown. An actuator arm 25 of an actuator arm assembly, with the magnetic head 22 at the tip end, may swing about an actuator arm axis 27 fixed to the base 20. As shown, the swinging movement of the actuator arm 25 is caused by a magnetic circuit 26 that includes an actuator. The magnetic heads 22 are positioned to a target recording track and block through the rotation of the disks 21 and the swinging movement of the actuator arm 25.

A top cover plate 30 can close a housing opening 29 of the base 20. The top cover plate 30 can be fastened to the base 20 by a variety of fasteners. As shown, top cover plate 30 can be coupled to the base 20 using screws 31 positioned at four corners of the top cover plate 30 so as to form the housing 19. As shown, screw receiving recesses 32 are formed at the corners of the top cover plate 30 so as to prevent the heads of the screws 31 from protruding from the level of the surface of the top cover plate 30. Steps 34 can be formed on the base 20 inside a housing edge 33 at the corners for receiving the screw receiving recesses 32 of the top cover plate 30. When the steps 34 receive the screw receiving recesses 32, the surface of the top cover plate 30 is leveled with the housing edge 33. Moreover, the heads of the screws 31 are prevented from protruding from the surface of the top cover plate 30.

When the top cover plate 30 is coupled to the base 20, two connecting screws 35 can be screwed into the tip ends of the rotation axis 24 and the axis 27. As shown, connecting screw receiving recesses 36 are formed in the top cover plate 30 so as to prevent the heads of the connecting screws 35 from protruding from the level of the surface of the top cover plate 30. The top cover plate 30 may be formed by a press from a metal plate such as aluminum. The press can shape the screw receiving recesses 32 and the connecting screw receiving recesses 36 on the top cover plate 30.

Figure 3:
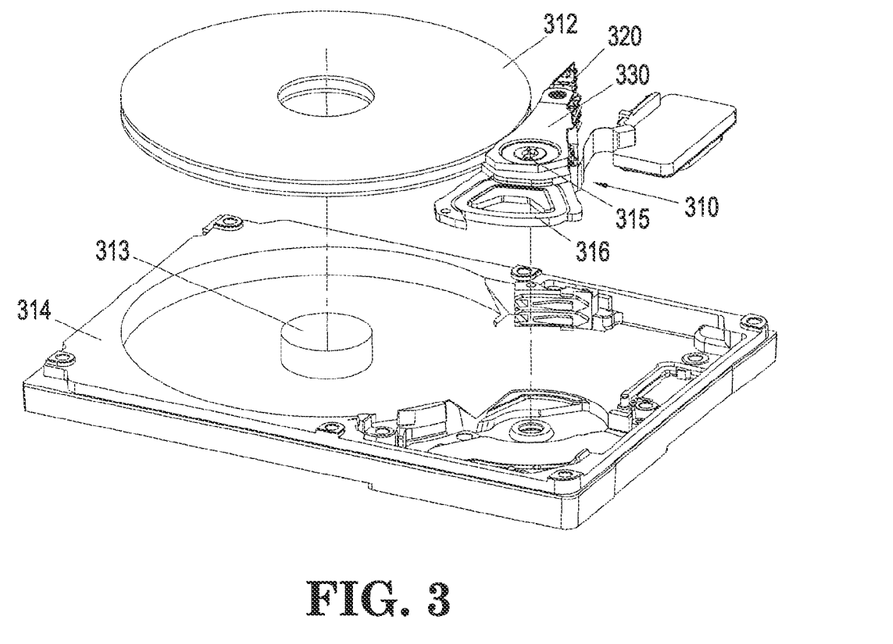
FIG. 3 is a schematic, exploded view of a hard disk drive.

Referring to FIG. 3, a hard disk drive can include a head stack assembly (HSA) 310 with one or more sliders (not shown) thereon, a magnetic disk 312 mounted on a spindle motor 313 which causes the magnetic disk 312 to spin, and a base 314 to support the above-mentioned components.

A slider can "fly" over the surface of the magnetic disk 312 at a high velocity to read data from or write data to concentric data tracks on the magnetic disk 312, which is positioned radially by a voice coil embedded (e.g. by epoxy potting or overmolding) in a fantail spacer 316 of the HSA 310. A voice coil motor (VCM) is used to drive the voice coil.

As shown in FIG. 3, HSA 310 includes an actuator arm assembly 330 having a fantail spacer 316. HSA 310 also includes a head-gimbal assembly (HGA) 320 connected to the actuator arm assembly 330. Actuator arm assembly 330 is rotatably mounted to the base 314 via bearing assembly 315.

According to one aspect of the present disclosure, one or more composite data storage device components can be formed by selectively applying one or more solid-state deposition layers to one or more areas of a given data storage device component. One or more material properties of a data storage device component can be modified and controlled by selectively applying the one or more solid-state deposition layers to data storage device component.

Forming a composite component by applying one or more solid-state deposition layers can take advantage of one or more of different material properties, different shapes of material (e.g., ribs), and the like, which can provide one or more benefits as described below with reference to illustrative embodiments.

As used herein, an "elastic modulus" (also known as Young's modulus (E)) of a material (e.g., a data storage device component such as an aluminum actuator arm) is a quantity that is independent of geometry and measures the resistance of an object to being deformed elastically when a stress is applied to it. The elastic modulus of an object is defined as the slope of its stress-strain curve in the elastic deformation region, and is described by the following formula:

$$E = \sigma/\varepsilon, \text{ where}$$

$\sigma$ is the uniaxial stress reported in pressure units (e.g., pascal); and $\varepsilon$ is the strain (nondimensional).

As used herein, a "composite data storage device component" refers to a data storage device component (e.g., an actuator arm assembly) that has at least one solid-state, deposition layer applied to at least a portion of one or more surfaces of the data storage device component so as to form a composite data storage device component. A data storage device component includes components that are primarily used to form a housing ("data storage device housing components") and components located inside the housing, outside the housing, or mounted in a housing component wall and are primarily related to the operation of the data storage device. The data storage device component to be coated via solid state deposition can be made using one or more conventional techniques. For illustration purposes, a data storage device component could be made out of aluminum and formed via stamping, extrusion, and the like. One or more properties (e.g., static stiffness, vibration and dynamic response, and the like) of the data storage device component can be modified according to the present disclosure by applying one or more solid-state deposition layers to at least a portion of the data storage device component to form a composite data storage device component. As illustrated below, creating a composite structure via solid-state deposition permits the use of materials different from the underlying substrate (data storage device component) to be strategically applied so as to improve, e.g., static stiffness. As another example, creating a composite structure via solid-state deposition permits the use of material that is the same as the underlying substrate (data storage device component) to be strategically applied in a form (e.g., ribs) so as to improve, e.g., static stiffness. A "composite data storage device housing component" specifically refers to a data storage device housing component (e.g., a base or cover) that has at least one solid-state, deposition layer applied to at least a portion of one or more surfaces of the data storage device housing component so as to form a composite data storage device housing component.

As used herein, the "static stiffness" of an object (e.g., composite data storage device component) refers to the deflection of the object due to an applied, nonmoving load. The static stiffness of an object is a function of the material that it is made out of and its geometry. Static stiffness can be measured by commercially available structural testing equipment, for example, from Instron®.

As used herein, the "vibration" or "dynamic" response of an object (e.g., composite data storage device component) refers to how an object responds when a dynamic or vibration loading is applied. The vibration or dynamic response can depend on the ratio of the static stiffness to the mass of the object. A vibration or dynamic response can be reported in terms of one or more vibration modes. Vibration modes have a characteristic shape and frequency. A mode shape is the relative deformation shape that a structure will take when vibrating. A structure can have many vibration modes. Which mode is excited depends on the excitation force that is applied to the structure. For example, if the torsional mode and the bending mode are excited at the same time, the resulting shape would be the superposition of the bend mode and the torsion mode of the structure, each mode occurring at its natural frequency. Vibration modes are named by the shaped they suggest such as bending, torsion, sway, etc. Nonlimiting examples of vibration modes include first bending mode, second bending mode, third bending mode, first torsion mode, second torsion mode, and combinations thereof. Vibration modes can be measured using commercially available equipment such as a laser Doppler vibrometer (LDV). In some embodiments, it can be desirable to apply one or more solid state deposition layers to increase the frequency of one or more modes of a composite structure as compared to the underling substrate. In some embodiments, it can be desirable to apply one or more solid state deposition layers to decrease the amplitude of one or more modes of a composite structure as compared to the underling substrate.

One or more solid-state deposition layers can be applied to a wide variety of data storage device components according to the present disclosure. In some embodiments, a data storage device component is present in the interior of a corresponding data storage device housing, especially one or more data storage device components that move during operation and could benefit from improved dynamic performance by controlling their static stiffness, geometry, and mass. Nonlimiting examples of data storage device components include one or more of a head-stack assembly and any component thereof such as an actuator arm assembly and head-gimbal assembly.

According to an embodiment of the present disclosure, at least one solid-state, deposition layer is applied over at least a portion of one or more surfaces of the data storage device component to form a composite data storage device component.

One or more solid-state deposition layers can be applied to a substrate in a manner depending on one or more factors such as areas identified to be high modal strain areas for problem modes of vibration, and the like. Applying one or more solid-state deposition layers of one or more materials having a relatively higher elastic modulus (as compared to the underlying substrate) to at least a portion of a substrate may improve one or more performance parameters such as static stiffness, reduced deflection, and actuator dynamics. For example, a material (e.g., steel or steel alloy) can be applied to at least a portion of an aluminum actuator arm identified to be an area or areas that experience undue stress or strain. This way, selectively applying steel or steel alloy to aluminum can take advantage of the relatively higher elastic modulus steel or steel alloy in identified areas of undue stress or strain while managing added weight due to the added material. To facilitate identifying areas to selectively apply one or more solid-state deposition layers, numerical analysis (e.g., finite element analysis) can be used. In some embodiments, selectively applying a small amount of a solid-state deposition layer of a material having a relatively higher elastic modulus and/or density can significantly improve static and dynamic performance while controlling the amount of added weight.

A wide variety of materials can be used for solid-state deposition. In some embodiments, at least one solid-state deposition layer is made of material chosen from ductile metals and alloys, polymers and polymers, or blends of >50 vol % ductile materials with brittle metals or ceramics. Nonlimiting examples of metallic particles that can be deposited via solid-state (e.g., via cold spray) include metals and/or metal alloys such as one or more of zinc (Zn), tin (Sn), nickel (Ni), chromium (Cr), silver (Ag), copper (Cu), aluminum (Al), titanium (Ti), niobium (Nb), molybdenum (Mo), nickel-chromium (NiCr), copper-aluminum (Cu—Al), aluminum alloys, nickel alloys, steel, and MCrAlYs, where M=cobalt, nickel, or cobalt/nickel. Nonlimiting examples of ceramic particles that can be deposited via solid-state (e.g., via cold spray) include one or more of alumina (aluminum oxide), silicon nitride, zirconium oxide, aluminum nitride, silicon carbide, and tungsten carbide. In some embodiments, any of the mentioned metal and ceramic particles can be combined together and applied via cold spray to form a composite material of metal and ceramic. In some embodiments, the solid-state, metallic deposition layer can have an elastic modulus that his greater than the elastic modulus of the underlying substrate (e.g., actuator arm assembly). For example, solid state deposition materials can have an elastic modulus greater than or equal to steel (e.g., about 200 GPa or greater).

Figure 4:
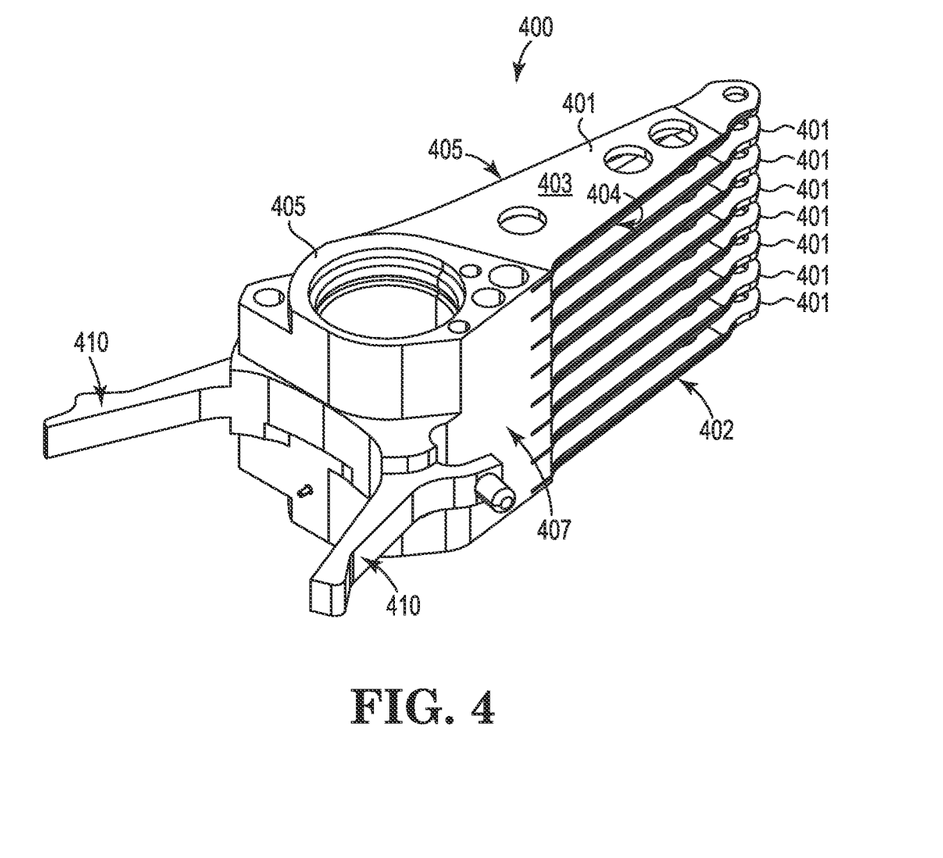
FIG. 4 is a perspective view of a composite actuator arm assembly according to an embodiment of the present disclosure.

A nonlimiting example of a composite data storage device component formed according to the present disclosure is illustrated herein by reference to FIG. 4 and with respect to composite actuator arm assembly 400. As shown in FIG. 4, actuator arm assembly 400 is a composite structure that is formed by applying a solid-state, deposition layer over all surfaces of an underlying aluminum actuator arm assembly. Here, the underlying aluminum actuator arm assembly is a metallic substrate having a first elastic modulus and the solid-state deposition layer is metallic and has a second elastic modulus that is different from (e.g., greater than) the first elastic modulus.

Data storage device components can be made from a wide variety of materials such as metal, plastic, ceramic, and combinations thereof. Nonlimiting examples of metals include aluminum, and alloys thereof. As mentioned above, the underlying actuator arm assembly in FIG. 4 is made of aluminum and includes extruded aluminum actuator arms that form composite arms 401.

The static stiffness of the composite structure 400 depends on, for example, the geometry of the actuator arm assembly, the material(s) selected for the one or more solid-state, metallic deposition layers, and the material of the underlying metallic substrate.

In one embodiment, a solid-state deposition layer of steel or steel alloy can be applied to an aluminum actuator arm assembly to form composite 400, thereby increasing the static stiffness of the composite actuator arm assembly 400. Advantageously, by applying a material having a relatively higher elastic modulus (e.g., applying steel to aluminum) the dynamic performance of a head stack assembly that includes the composite actuator arm assembly 400 can be improved, e.g., to control vibration of head stack assembly. Before applying one or more solid-state deposition layers to at least a portion of actuator arm assembly 400, each portion of the actuator arm assembly 400 has an elastic modulus that corresponds to the material that each portion is made of (e.g., aluminum).

As mentioned above, for illustration purposes, a single solid-state, metallic deposition layer of steel or steel alloy can be applied to an entire aluminum actuator arm assembly to form composite 400. Alternatively, a wide variety of patterns, layers, materials, and layer thicknesses can be used according to the present disclosure, which can influence the mass, static stiffness and/or vibration response of the corresponding composite structure.

In some embodiments, one or more solid-state deposition layers are present on at least a portion of the top surface 403 of an actuator arm 401 and/or a bottom surface 404 of an actuator arm 401, which can improve arm bending and/or arm torsional modes (such modes are discussed below). In some embodiments, one or more solid-state deposition layers are present on at least a portion of the side 402 of actuator arm 401 and/or the side 405 of actuator arm 401, which can improve system and/or arm sway modes. In some embodiments one or more solid-state deposition layers are present on at least a portion of the side region 407 of actuator body 405, which may improve system mode. In some embodiments one or more solid-state deposition layers are present on at least a portion of the fantail spacer 410, which can improve coil bending and/or torsion modes. In some embodiments, a plurality of solid-state deposition layers of can be applied to an underlying substrate to form a composite structure. In addition, different materials can be used among two or more layers.

A solid-state deposition layer according to the present disclosure can have a wide variety of thicknesses. In some embodiments, the thickness of a layer may be one inch or less, for example, in the range from 0.001 inches to 0.1 inches. In some embodiments, the thickness of a layer may vary throughout the layer, e.g., to manage weight, stiffness, and/or vibration response of the composite structure.

A solid-state material according to the present disclosure can be deposited in a wide variety of patterns. In some embodiments, a pattern may be an irregular pattern of discontinuous regions on a surface of data storage device component. For example, one or more layers of solid-state material can be applied to select areas identified as contributing to vibration problems. Such areas may result in regular (repeating) patterns or irregular patterns of application of material, where the material that is deposited has a relatively higher elastic modulus as compared to the underlying substrate. In some embodiments, the solid-state material is deposited on a surface of substrate that is not along a joint line where the substrate is joined to an adjacent substrate.

In some embodiments, one or more solid-state deposition layers may be present on only a portion of the top surface 403 of an actuator arm 401, a bottom surface 404 of an actuator arm 401, side 402 of actuator arm 401, and/or side 405 of actuator arm 401. In some embodiments, one or more solid-state deposition layers may be present on only a portion of actuator body 405, such as a portion of the side region 407 of actuator body 405. In some embodiments, one or more solid-state deposition layers may be present on only a portion of fantail spacer 410.

Solid state deposition processes function by propelling particles at high velocity to impact a substrate (e.g., a surface of a data storage device component and/or housing component). When the particles impact the substrate, the particles undergo solid-state plastic deformation and fusion, forming a bond (e.g., metallurgical bond) to the surface and a relatively dense coating on the surface. Accordingly, solid-state deposition is an additive process that can build up a deposition layer or a joint to a desired thickness. In some embodiments, the solid-state material may be deposited according to "cold-spray" process, which is a gas-dynamic acceleration of particles to supersonic velocities such as 300-1200 m/sec. Because solid state deposition is a solid state process, it has one or more advantages such as reduced heat input, oxidation, and grain growth. Further advantages of solid state deposition, and in particular cold spray are as follows: high deposition rate, little or no masking required, no grit blast required, high density, flexibility in substrate coating, minimum thermal input to substrate, high bond strength, compressive residual stresses, ultra-thick coatings are possible, no undue oxidation, no undue grain growth, high conductivity, high corrosion resistance, and high strength and hardness.

A cold spray process may include directing powder particles and a carrier gas through a nozzle. In some embodiments, the carrier gas is heated. The resulting high-velocity particle-gas mixture may thus be directed at a substrate. As the high-velocity particle-gas mixture impacts the substrate, a layer of deposited material may form thereon as the particles plastically deform and bond to substrate. As additional particle-gas mixture is directed to the substrate, the thickness of the resulting layer of deposited material continues to build to the extent desired.

One advantage of solid state deposition processes such as cold spray is that the material from which the powder particles are formed may be selected to define a desirable characteristic of the composite that is formed such as static stiffness. For example, the material defining the powder particles may be selected to match the material defining the substrate. In some embodiments, the powdered particles are formed from aluminum. However, as discussed above, differing materials may be selected in other embodiments.

The powder particles for cold spray can be selected to flow through a nozzle as described above. Cold spray can be performed with atomized powder. The atomization process can generate spherical particulates which flow well through the nozzle. For cold spray, the powder particles can be in the range of 1-50 μm (micrometers) diameter. Uniformity of the size of the powder particles is advantageous in that deposition rates tend to increase with less variation in size.

With respect to the gas used in a cold spray process, nonlimiting examples include helium, nitrogen and the like. In some embodiments, inert gases such as helium or nitrogen can be selected. In some embodiments, helium can be used to cold spray some high melting temperature alloys so that appropriate velocities can be achieved to provide the kinetic energy sufficient for the particle to bond with the substrate on impact. In this regard, the sonic velocity of helium is desirable. Helium may also be desirable if the gas is heated for a particular cold spray application. For example, a carrier gas may be pre-heated to about 800° C. (1472° F.), or below the melting point of many metals, to increase the velocity and/or aid in particle deformation.

A nozzle for cold spray may be provided in various forms. For example, in a low pressure application, a de Laval nozzle may be employed. By way of further example, in a high-pressure application (e.g., up to 500 psi (3.5 MPa)), a supersonic nozzle may be employed. Additionally, in some embodiments it may be desirable to spray a relatively large area in a single pass, for example to decrease cycle times associated with solid state deposition. Accordingly, multiple nozzles may be employed. Alternatively, a nozzle including multiple ducts may be employed to spray over a relatively wider area than a nozzle including a single duct. Thus, in some embodiments the solid state deposition may be completed in a single-pass.

An example of cold-spray deposition is reported in U.S. Pat. No. 9,951,425 (Lancaster-Larocque et al.), wherein the entirety of said patent is incorporated herein by reference.

As mentioned above, one or more modal frequencies of a metallic substrate (e.g., aluminum actuator arm assembly) can be improved by applying a material having a different (e.g., higher) elastic modulus via solid-state deposition to an underlying substrate. Nonlimiting examples of such frequencies include a first bending mode, a second bending mode, a third bending mode, a first torsion mode, a second torsion mode, and combinations thereof.

Performance Modeling of Modal Frequencies

Modeling software was used to evaluate applying a material via cold spray to an underlying substrate that is comparable to an actuator arm. Modal frequency comparison (Steel, Aluminum, Steel Clad Aluminum) is performed with respect to a generic beam (representation of a disk drive actuator arm such as in the form of 401 in FIG. 4). The dimensions of the actuator arm modeled are 12.5 mm at the base (near actuator body 405), 6.25 mm at the tip, and 1 mm thick. The natural frequencies are determined for 3 different materials (solid aluminum, solid steel, and steel clad aluminum composite (from the Coldspray process)) and are shown in Table 1 below. The steel cladding is 0.125 mm thick.

TABLE 1

| Mode Description | Frequency (Steel) | Frequency (Aluminum) | Frequency (Steel Clad Aluminum) | Steel Clad advantage over Aluminum (% increase) |
| --- | --- | --- | --- | --- |
| $1^{st}$ Bending | 694 | 699 | 825 | 18 |
| $2^{nd}$ Bending | 3795 | 3818 | 4500 | 18 |
| 1st Torsion | 5793 | 5756 | 6760 | 17 |
| Sway | 7246 | 7268 | 7258 | 0 |
| 3rd Bending | 10187 | 10249 | 12030 | 17 |
| 2nd Torsion | 14910 | 14831 | 17348 | 17 |

According to one aspect of the present disclosure, one or more composite data storage device housing components can be formed by selectively applying one or more solid-state deposition layers to one or more areas of a given data storage device housing component. One or more material properties of a data storage device housing component can be modified and controlled by selectively applying the one or more solid-state deposition layers to data storage device housing component. Forming a composite housing component by applying one or more solid-state deposition layers can take advantage of one or more of different material properties, different shapes of material (e.g., ribs), and the like, which can provide one or more benefits as described below with reference to illustrative embodiments. One notable benefit is increasing the static stiffness to reduce deflection while at the same time not changing the interior and/or exterior dimensions of a housing component to an undue degree.

Except as otherwise noted below, the disclosure above with respect to solid-state deposition and data storage device components similarly applies to data storage device housing components.

One or more solid-state deposition layers can be applied to a wide variety of data storage device housing components according to the present disclosure. Nonlimiting examples of data storage device housing components include one or more of a base and cover. In some embodiments, the housing components include a base and/or cover of hard disk drive. Hard disk drives can sometimes have multiple covers. For example, a process cover can be attached to a base during manufacturing and then a final cover can applied over the process cover toward the end of manufacturing.

According to an embodiment of the present disclosure, at least one solid-state deposition layer is applied over at least a portion of one or more surfaces of a data storage device housing component to form a composite data storage device housing component. Two nonlimiting examples of composite data storage housing components are illustrated herein with reference to hard disk drive final cover 500 in FIG. 5 and hard disk drive base 600 in FIG. 6.

Figure 5:
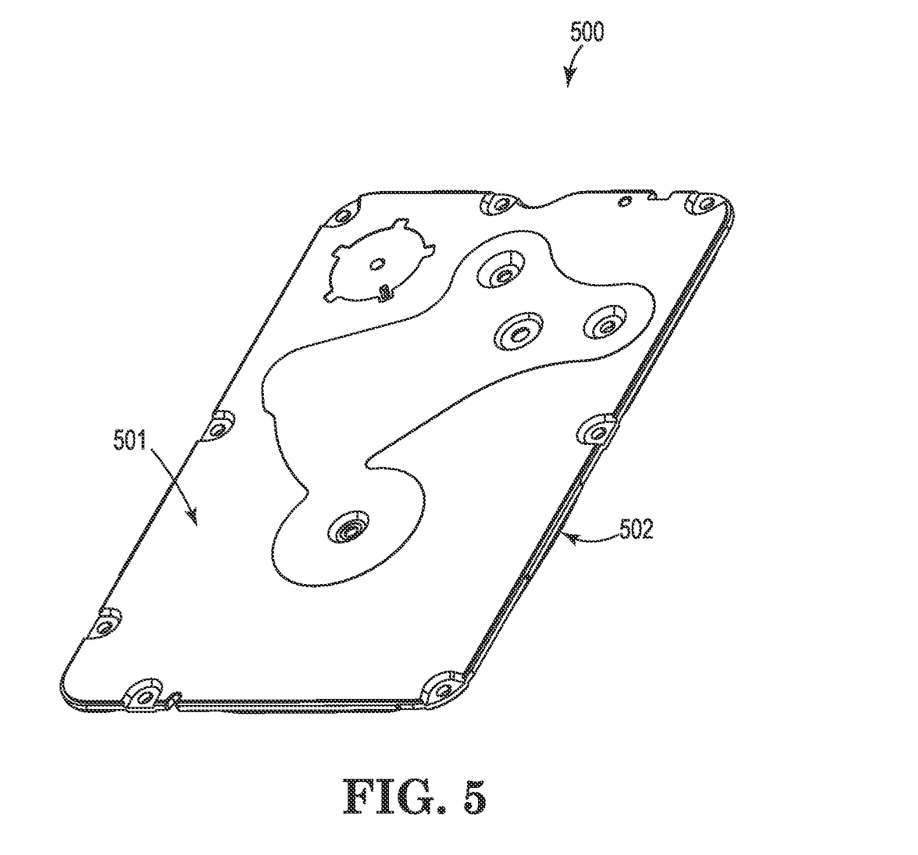
FIG. 5 is a perspective view of a composite hard disk drive top cover according to an embodiment of the present disclosure.

As shown in FIG. 5, cover 500 is a composite structure that is formed by applying a solid-state, metallic deposition layer over all surfaces of an underlying aluminum cover. Here, the underlying aluminum cover is a metallic substrate having a first elastic modulus and the solid-state, metallic deposition layer has a second elastic modulus that is different from the first elastic modulus of the underlying aluminum structure.

Hard disk drive cover substrates that can have one or more solid-state deposition layers applied thereto are made from a wide variety of materials such as metal, plastic, ceramic, and combinations thereof. More specific nonlimiting examples of cover substrate materials include aluminum, steel, magnesium, alumina, and the like. As mentioned above, the underlying substrate cover in FIG. 5 is made of aluminum.

The static stiffness of the composite structure 500 depends on, for example, the geometry of the cover, the material(s) selected for the one or more solid-state, metallic deposition layers, and the material of the underlying metallic substrate.

In one embodiment, a solid-state deposition layer of steel is applied to the top and bottom of the aluminum cover substrate to form composite cover 500, thereby increasing the static stiffness of the composite cover 500. Advantageously, by applying a material having a relatively higher elastic modulus (e.g., applying steel to aluminum) the dynamic and/or static performance of cover 500 can be improved, e.g., to reduce deflection due to pressure differences between the outside and inside of the corresponding hard disk drive.

As mentioned above, for illustration purposes, a single solid-state, metallic deposition layer is applied over the whole metallic substrate to form a composite cover 500. Alternatively, a wide variety of patterns, layers, alloys, and layer thicknesses can be used according to the present disclosure, which can influence the static stiffness of the corresponding composite structure.

Nonlimiting examples of how one or more solid-state deposition layers are selectively applied to a data storage device cover substrate are discussed below for illustration purposes.

For example, as areal density increases the interior of hard disk drives may be filled with helium in order to reduce vibration caused by airflow with respect to one or more disks and corresponding head suspension assemblies. In order to fill the drive with helium, the enclosed hard disk drive may be evacuated first, which can form a vacuum inside the hard disk drive with atmospheric pressure (e.g., 14.7 psi) being applied on the outside of the drive (including the cover). In some embodiments, the atmospheric pressure can cause overall load on the top cover to be on the order of 300 lbs. It is desirable that the hard disk drive cover support such pressure loads without deflecting to an undue degree so that the hard disk drive cover does not contact internal hard disk drive components in an undesirable manner (e.g. contacting the head stack assembly).

As another example, as areal density increases one or more interior hard disk drive components may be secured to the hard disk drive cover to improve the dynamic performance there. For example, the head stack assembly pivot bearing, the motor shaft and/or the VCM assembly may be fastened to the hard disk drive top cover to help stabilize such components during hard disk drive operation.

As yet another example, as drive capacity increases the number of disks may be increased in the drive to accommodate the increased capacity. If the number of disks is increased within the same form factor, the spacing between disks is reduced while the overall mass of the disk pack is increased. Providing a hard disk cover with acceptable stiffness helps provide acceptable shock resistance (e.g., in response to impact) to the hard disk drive, especially if the weight of the hard disk drive increases. To accommodate an increase in capacity and number of disks, however, the thickness of a hard disk drive cover may stay the same or be reduced even though the overall weight increases. This can impact the ability of the disk drive to be sufficiently resistant to shock and vibration. And the increase in weight per hard disk drive can be undesirable with respect to shipping.

Selectively applying one or more solid-state deposition layers having a relatively higher elastic modulus as compared to an underlying cover substrate may improve one or more performance parameters such as static stiffness of the cover substrate. In some embodiments, the data storage device housing component includes a hard disk drive cover having the one or more composite regions. For example, in some embodiments, one or more solid-state deposition layers are present on at least a portion of the top surface 501 of cover 500 and/or a bottom surface 502 of an actuator arm 401, which can improve static stiffness and reduce the amount that cover 500 deflects when subjected to a pressure load, while at the same time controlling the overall weight of the cover 500.

In some embodiments, a composite cover can have a deflection value measured according to the Deflection Test that is less than a deflection value measured according to the Deflection Test for the same area of the hard disk drive cover without any solid state deposition layer. As used herein, the "Deflection Test" is performed by evacuating the hard disk drive and measuring the amount that the composite cover deflects. In some embodiments, a composite cover can deflect less than 15 mils, less than 10 mils, or even less than 5 mils.

By selecting appropriate patterns, thicknesses, and/or materials for solid-state deposition, the static stiffness can be improved while at the same time managing the weight that is added to the substrate (disk drive cover) via solid state deposition.

Performance Modeling

Modeling software is used to evaluate applying a material via cold spray to an underlying substrate having a form similar to cover 500 in FIG. 5.

The overall dimensions of the covers modeled are 1 mm thick with an area of 100×152 mm. Two Coldsprayed design options with a steel layer top and bottom to provide the same overall thickness are modeled (0.125 mm and 0.25 mm thick steel layers).

With respect to cover dynamics, the bending modes in Table 2 below show that for the same overall cover thickness the composite covers have an increase in natural frequency over the steel or aluminum covers with no cladding.

TABLE 2

| Mode | Hz - Aluminum | Hz - Steel | Hz - 0.125 mm Steel Clad Aluminum | Hz - 0.25 mm Steel Clad Aluminum |
|---|---|---|---|---|
| 1$^{st}$ Bending | 497 | 490 | 559 | 550 |
| 2$^{nd}$ Bending | 798 | 789 | 913 | 897 |

With respect to weight reduction, Table 3 below shows that the 0.125 mm thick cladding is slightly greater than half of the weight for the same thickness steel cover. Table 3 also shows that the 0.25 mm thick cladding is about two-thirds of the weight for the same thickness steel cover.

TABLE 3

| Weight | Grams Aluminum | Grams Steel | Grams - 0.125 mm Steel Clad Aluminum | Grams - 0.25 mm Steel Clad Aluminum |
|---|---|---|---|---|
| | 42.1 | 119 | 61.4 | 80.7 |

With respect to evacuation deflection for a unit pressure load, Table 4 below shows that steel outperforms aluminum and the two steel clad aluminum options, but the 0.25 mm steel clad aluminum can reduce the deflection by 50% as compared to only aluminum.

TABLE 4

| Evacuation deflection | mm - Aluminum | mm - Steel | mm - 0.125 mm Steel Clad Aluminum | mm - 0.25 mm Steel Clad Aluminum |
|---|---|---|---|---|
| | 5.9 | 2.1 | 3.2 | 2.5 |

Figure 6:
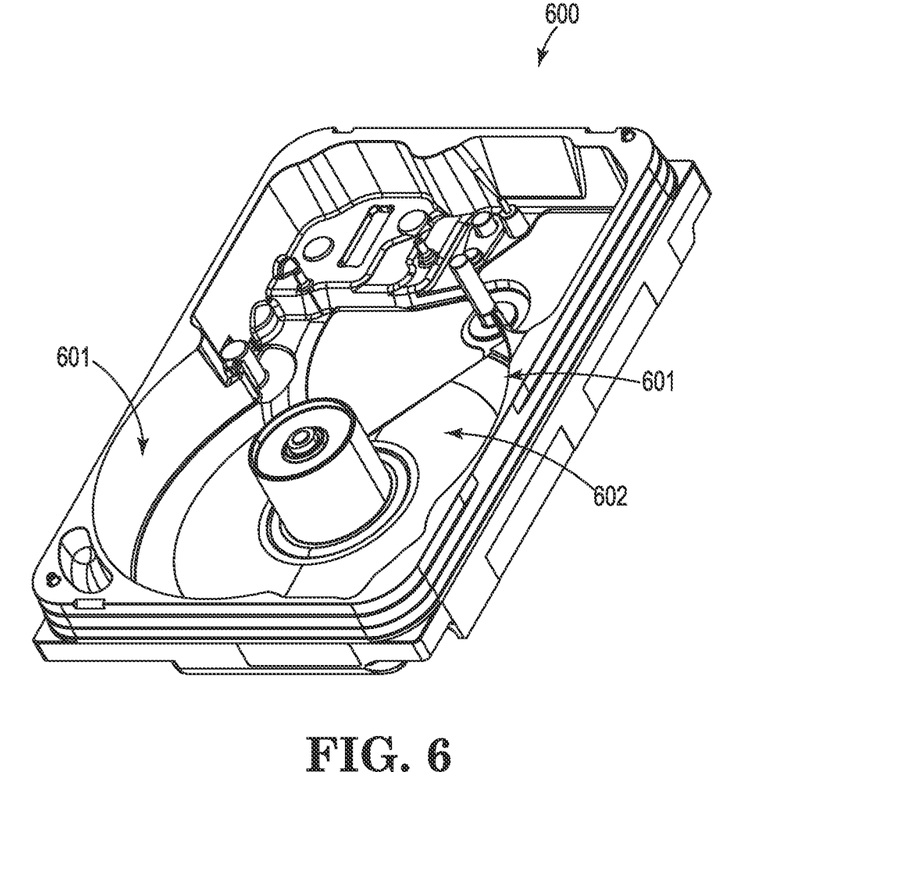
FIG. 6 is a perspective view of a composite hard disk drive base according to an embodiment of the present disclosure.

As shown in FIG. 6, base 600 is a composite structure that is formed by applying a solid-state, metallic deposition layer over all surfaces of an underlying aluminum base. Here, the underlying aluminum base is a metallic substrate having a first elastic modulus and the solid-state deposition layer has a second elastic modulus that is different from the first elastic modulus of the underlying aluminum structure.

Hard disk drive bases that can have one or more solid-state deposition layers applied thereto are made from a wide variety of materials such as metal, plastic, ceramic, and combinations thereof. More specific nonlimiting examples of disk drive base substrates include aluminum, and alloys thereof. As mentioned above, the underlying substrate base in FIG. 6 is made of aluminum such as wrought aluminum 6061-T6, or cast aluminums such as aluminum A380 or aluminum A384. A hard disk drive base can be either machined out of wrought aluminum or cast in aluminum and machined to desired tolerances.

The static stiffness of the composite structure 600 depends on, for example, the geometry of the cover, the material(s) selected for the one or more solid-state, metallic deposition layers, and the material of the underlying metallic substrate.

In one embodiment, a solid-state deposition layer of steel is applied to the top and bottom of the aluminum base substrate to form composite base 600, thereby increasing the static stiffness of the composite base 600. Advantageously, by applying a material having a relatively higher elastic modulus (e.g., applying steel to aluminum) the dynamic and/or static performance of base 600 can be improved.

As mentioned above, for illustration purposes, a single solid-state, metallic deposition layer is applied over the whole metallic substrate to form a composite base 600. Alternatively, a wide variety of patterns, layers, alloys, and layer thicknesses can be used according to the present disclosure, which can influence the static stiffness of the corresponding composite structure.

Nonlimiting examples of how one or more solid-state deposition layers are selectively applied to a data storage device base substrate can depend on one or more factors such as those discussed below for illustration purposes.

For example, as areal density and/or drive capacity increase the number of disks may be increased in the drive to accommodate the increased capacity. To accommodate the increase in the number of disks within the same form factor the thickness of the base may decrease, which can decrease the stiffness of the base. Providing a hard disk base with acceptable stiffness helps provide acceptable shock and vibration resistance (e.g., in response to impact) to the hard disk drive, especially if the weight of the hard disk drive increases.

As another example, as drive capacity increases, the hard disk diameter may also increase (e.g., from 95 mm to 97 mm). In addition to the larger mass, relatively thinner base walls may be used to accommodate a 97 mm diameter disk. Thinner base walls can reduce the axial stiffness of the base's ability to support the disk pack during a shock event. Another problem associated with thinner base walls is an undue base wall deflection (e.g., 1-2 mils), that can occur during friction stir welding the drive. The wall deflection during welding can reduce the clearance between the base wall and the edge of the disk.

Selectively applying one or more solid-state deposition layers having a relatively higher elastic modulus as compared to an underlying base substrate may improve one or more performance parameters such as stiffness of the base substrate, while at the same accommodating space restrictions with respect the interior and/or exterior of a hard disk drive. In some embodiments, the data storage device housing component includes a hard disk drive base having the one or more composite regions. In some embodiments, one or more solid-state deposition layers are present on at least a portion of the interior and/or exterior surface of floor 602 of base 600, which can improve stiffness and shock resistance. In some embodiments, one or more solid-state deposition layers are present on at least a portion of the interior and/or exterior surface of floor disk shroud walls 601 of base 600, which can improve torsional stiffness of base 600 and/or reduce deflection due to friction stir welding forging forces.

Performance Modeling

Modeling software is used to evaluate applying a material via cold spray to an underlying substrate having a form similar to base 600 in FIG. 6.

The dimensions of the base modeled are 4"×5.75"×0.87" with a 0.175" wall thickness and an 0.12" thick bottom. A mass and inertia element is used to represent the disk pack in the finite element model. Two cases with identical geometry are modeled, solid aluminum and aluminum with a 5 mil coldspray coating on the bottom and on the inside bottom of the base.

With respect to shock dynamics, the primary bending mode of the coldsprayed part excited in a z-axis shock event shows a 14% increase in frequency over the all aluminum base (492 Hz->563 Hz). Since the Coldspray process is an additive process, selective areas could be increased in thickness (e.g. creating ribs).

What is claimed is:

1. A composite data storage device component comprising at least one solid-state, deposition layer over only a portion of one or more surfaces of a data storage device component, wherein the data storage device component comprises an actuator arm assembly, wherein the actuator arm assembly comprises an actuator arm, an actuator body, and a fantail spacer, wherein the at least one solid-state, deposition layer is present on only a portion of a top surface of the actuator arm, on only a portion of a bottom surface of the actuator arm, on only a portion of a side of the actuator arm, on only a portion of the actuator body, on only a portion of the fantail spacer, and combinations thereof.

2. The composite data storage device component according to claim 1 wherein the at least one solid-state, deposition layer is present on only a portion of the actuator body, on only a portion of the fantail spacer, and combinations thereof.

3. The composite data storage device component according to claim 1, wherein the one or more surfaces of the data storage device component have a first elastic modulus, and the at least one solid-state, deposition layer has a second elastic modulus, wherein the first elastic modulus and the second elastic modulus are different from each other.

4. The composite data storage device component according to claim 3, wherein the second elastic modulus is greater than the first elastic modulus.

5. The composite data storage device component according to claim 3, wherein the data storage device component comprises a metallic substrate, and wherein the at least one solid-state, deposition layer comprises at least one solid-state, metallic deposition layer.

6. The composite data storage device component according to claim 5, wherein the composite data storage device component has a static stiffness that is greater than the data storage device component without the at least one solid-state, deposition layer.

7. The composite data storage device component according to claim 5, wherein one or more modal frequencies of the composite data storage device component are greater than one or more modal frequencies of the data storage device component without the at least one solid-state, deposition layer, wherein the one or more modal frequencies are chosen from first bending mode, second bending mode, third bending mode, first torsion mode, second torsion mode, and combinations thereof.

8. The composite data storage device component according to claim 5, wherein the metallic substrate is made of material chosen from metal and alloys thereof, and wherein the at least one solid-state, metallic deposition layer is made of material chosen from steel, nickel, and alloys thereof.

9. The composite data storage device component according to claim 1, wherein the at least one solid-state deposition layer was formed via cold-spray.

10. A composite data storage device component comprising at least one solid-state, deposition layer over only a portion of one or more surfaces of a data storage device component, wherein the at least one solid-state, deposition layer comprises a composite layer having metal and ceramic.

11. The composite data storage device component according to claim 10, wherein the metal is chosen from zinc, tin, nickel, chromium, silver, copper, aluminum, titanium, niobium, molybdenum, nickel-chromium, copper-aluminum, aluminum alloys, nickel alloys, steel, and MCrAlYs, where M=cobalt, nickel, or cobalt/nickel, and combinations thereof.

12. The composite data storage device component according to claim 11, wherein the ceramic is chosen from alumina, silicon nitride, zirconium oxide, aluminum nitride, silicon carbide, and tungsten carbide and combinations thereof.

13. The composite data storage device component according to claim 10, wherein the one or more surfaces of the data storage device component have a first elastic modulus, and the at least one solid-state deposition composite layer has a second elastic modulus, wherein the first elastic modulus and the second elastic modulus are different from each other.

14. The composite data storage device component according to claim 13, wherein the second elastic modulus is greater than the first elastic modulus.

15. The composite data storage device component according to claim 13, wherein the data storage device component comprises a metallic substrate.

16. The composite data storage device component according to claim 15, wherein the composite data storage device component has a static stiffness that is greater than the data storage device component without the at least one solid-state deposition composite layer.

17. The composite data storage device component according to claim 15, wherein one or more modal frequencies of the composite data storage device component are greater than one or more modal frequencies of the data storage device component without the at least one solid-state deposition composite layer, wherein the one or more modal frequencies are chosen from first bending mode, second bending mode, third bending mode, first torsion mode, second torsion mode, and combinations thereof.

18. The composite data storage device component according to claim 10, wherein the at least one solid-state deposition composite layer was formed via cold-spray.

* * * * *